Figure 1:
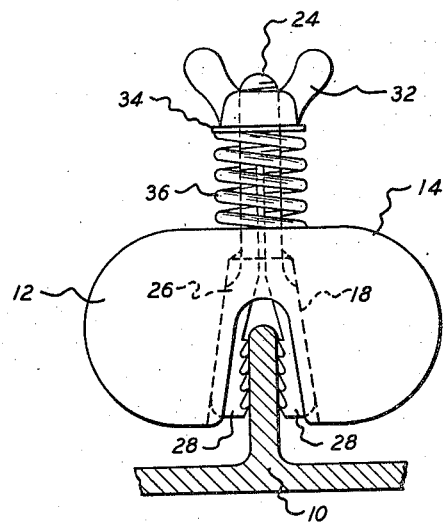

May 25, 1948. H. J. KALAJIAN 2,442,171
BALANCE WEIGHT
Filed July 3, 1944

Inventor
HARRY J. KALAJIAN
By Beaman + Langford
Attorneys

Patented May 25, 1948

2,442,171

UNITED STATES PATENT OFFICE 2,442,171

BALANCE WEIGHT

Harry J. Kalajian, Detroit, Mich., assignor to Harley C. Loney Company, Detroit, Mich., a corporation of Michigan Application July 3, 1944, Serial No. 543,350

3 Claims. (Cl. 301—5)

This is an improvement in the art of balancing wheels, pulleys and other rotated bodies, in which an out-of-balance state is detrimental to their operation at high rotational speeds.

During the past decade or more balance weights of the type shown in the United States Hume Patent No. 2,036,757 have been used by the millions to balance automobile wheels. There are certain types of wheels, however, to which this type of balance weight is not adaptable. This is particularly true in the case of aircraft wheels.

One of the objects of the present invention is to provide an improved balance weight which may be adjustably applied and reused on wheels and the like having structural flange and web portions. In aircraft wheels and heavy duty vehicle wheels it is the common practice to use radial reinforcing flanges, fins and webs. My improved weight is particularly designed for installation on such structure.

Another object of the present invention is to provide an improved balance weight which may be adjustably attached to members of various thickness.

A still further object of the invention is to provide a balance weight of the type described which may be adjustably attached, removed and reused and requires no special tools for its application and removal.

These and other objects and advantages residing in the construction and arrangement of the combination of parts will be more fully set forth hereinafter.

Figures 2, 3:
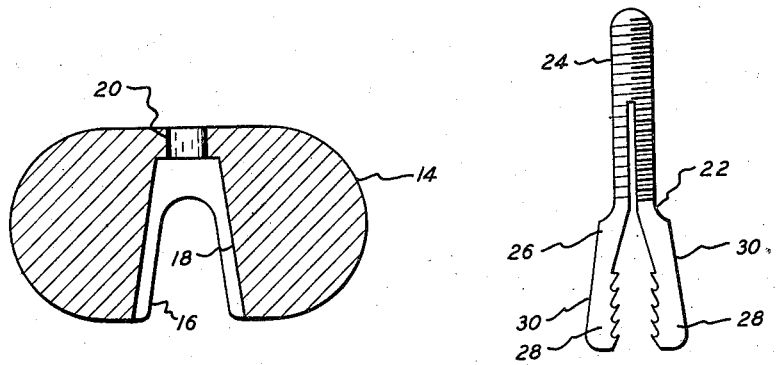

In the drawing,

Fig. 1 discloses a balance weight according to the present invention mounted on the radial reinforcing flange of an aircraft wheel, Fig. 2 is a cross-sectional view through the body of the balance weight shown in Fig. 1, and Fig. 3 is a side elevational view of the jaw bolt.

Referring to the drawing, the radial reinforcing flange portion of an aircraft wheel is indicated at 10. Shown secured to the flange 10 is a balance weight generally designated 12 consisting of a body portion 14, preferably of some heavy material such as steel, iron, alloy of leads, or the like.

As is more clearly shown in Fig. 2, the body 14 has a transverse slot 16 to provide clearance for the flange 10. The slot 16 opens into a central wedge shaped recess 18 into which a centrally located bore 20 extends. The jaw bolt 22, shown in Fig. 3, has an upper threaded end 24 and a slotted central and lower end 26 terminating in jaws 28. The sides 30 of the jaws 28 have an angle of conversion approximating that of the wedge shaped recess 18. From a consideration of Fig. 1, it will be noted that the jaw bolt 22 is assembled in the body 14 by inserting the threaded end 24 through the bore 20 and positioning the jaws 28 in the wedge shaped recess 18. A thumb nut 32, washers 34 and coil springs 36 complete the assembly.

In practice, to apply the balance weight to a radial flange or other part of the structure to be balanced, the thumb nut 32 is loosened and the jaw bolt 22 is moved in a nonwedging direction to increase the opening between the jaws 28. To tighten the jaws 28 on the flange 10, with the jaws 28 straddling the flange 10, a tightening of the thumb nut 32 will draw the draw bolt into the recess 18 to bring the jaws 28 into firm gripping relation with the flange 10 to hold the balance weight in position. To loosen and remove the balance weight from the flange 10, it is only necessary to loosen the nut 32. It should be apparent that the jaws 28 will adjust themselves to grip on flanges of different widths over a considerable range.

What I claim as new and desire to cover by Letters Patent is:

1. A balance weight comprising a body portion, a wedge shape recess in said body portion, an axially split wedge bolt having jaw portions, said bolt having portions thereof supported in said wedge shape recess, and screw means for drawing said bolt into said recess to bring said jaws together for clamping the balance weight on a supporting structure.

2. A balance weight comprising a heavy body portion, an attachment portion in the form of opposed jaws, wedge surfaces along which said jaws are adapted to be moved, and screw means for drawing said jaws along said wedged surfaces to move said jaws toward each other to clamp said balance weight on the supporting structure.

3. A balance weight comprising a heavy body portion, a jaw bolt having spaced jaw portions at its lower end, means within said body portion to receive said jaw bolt, and screw means for drawing up said bolt to move said jaws toward each other to clamp the balance weight on a supporting structure.

HARRY J. KALAJIAN.

REFERENCES CITED

The following references are of record in the file of this patent:

UNITED STATES PATENTS

| Number | Name | Date |
|---|---|---|
| 73,609 | Jones | Jan. 21, 1868 |
| 1,323,432 | Zandecki | Dec. 2, 1919 |
| 2,304,816 | Griffith | Dec. 15, 1942 |